Sept. 11, 1923.  
H. B. TURNER  
1,467,404  
COMBINED REAR LIGHT AND LICENSE PLATE CARRIER  
Filed Sept. 11, 1922
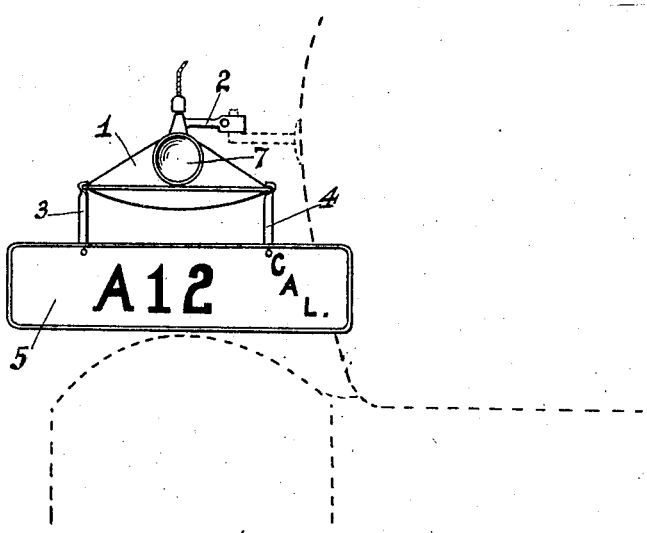
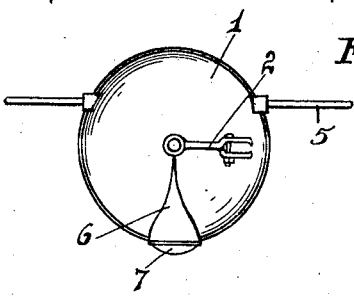
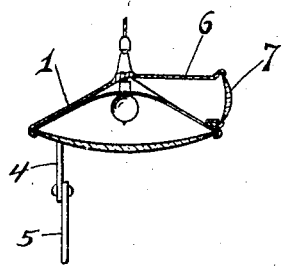
INVENTOR
Henry B. Turner.
BY
ATTORNEY Patented Sept. 11, 1923.

1,467,404

UNITED STATES PATENT OFFICE.

HENRY B. TURNER, OF SUISUN, CALIFORNIA.

COMBINED REAR LIGHT AND LICENSE-PLATE CARRIER.

Application filed September 11, 1922. Serial No. 587,362.

*To all whom it may concern:*

Be it known that I, HENRY B. TURNER, a citizen of the United States, residing at Suisun, in the county of Solano and State of California, have invented certain new and useful Improvements in Combined Rear Lights and License-Plate Carriers, of which the following is a specification.

My invention is an improved combined rear light and license plate carrier for automobiles.

The object of my invention is to provide a light which will clearly illuminate the rear and side of the automobile so that the possibility of collision is reduced.

The light is thrown upon the side of the automobile and on the road so that an approaching driver can clearly discern the outlines of the automobile and will not be blinded by the headlights.

Another object is to illuminate the license plate so that it may be seen for a considerable distance.

Referring to the drawing which forms a part of this specification:

Figure 1 is a rear view of my light and license carrier.

Figure 2 is a top plan view of the same.

Figure 3 is a transverse sectional view of the same.

Referring more particularly to the drawing, the numeral 1 indicates a light projector which is adapted to project the light rays downwardly. A horizontal fastening arm 2 extends from the projector 1 and is secured to a suitable lug on the automobile, preferably on the left rear fender.

Arms 3 and 4 are secured to the projector 1 and depend therefrom, and the license plate 5 is secured to the lower end of said arms at a substantial distance below the light projector 1. This places the plate 5 directly in the path of the light from the projector 1 and clearly illuminates the figures on said plate. The light rays also are projected forwardly of the license plate 5 so as to give a warning to an approaching car whereby the possibility of a collision is greatly reduced.

A rearwardly projecting light projector 6 is formed integral with the projector 1 and is covered with the conventional red glass 7.

Having described my invention, I claim:

1. A combined rear light and license plate carrier adapted to be carried on one side and to the rear of an automobile comprising a downwardly projecting light projector substantially circular in horizontal cross section and parabolic in vertical cross section, a rearwardly projecting light projector, and means for securing a license plate to said first mentioned projector at a substantial distance below the same whereby rays of light may be seen by an approaching driver and the license, one side and the rear of the car are illuminated.

2. A combined rear light and license plate carrier adapted to be carried on one side and to the rear of an automobile comprising a downwardly projecting light projector substantially circular in cross section, each lower cross section being larger than any cross section above the same, a rearwardly projecting light projector, and means for securing a license plate at a substantial distance below the first mentioned projector whereby rays of light may be seen by an approaching driver and the license, one side and the rear of the car are illuminated.

3. A combined rear light and license plate carrier adapted to be carried on one side and to the rear of an automobile comprising a wide mouthed downwardly projecting light projector, substantially circular in cross section having the sides thereof extending below the light contained therein whereby the rays of light may not shine straight forward into the eyes of an approaching driver and thereby temporarily blind him, a rearwardly projecting light projector, and means for securing a license plate to said first mentioned projector at a substantial distance below the same whereby rays of light may be seen by an approaching driver and the license, one side and the rear of the car are illuminated.

In testimony whereof I affix my signature.

HENRY B. TURNER.